United States Patent
Balabhadruni et al.

(10) Patent No.: US 9,866,672 B2
(45) Date of Patent: Jan. 9, 2018

(54) METHOD AND APPARATUS FOR ASSISTED EMERGENCY CALLS

(71) Applicant: Telefonaktiebolaget LM Ericsson (publ), Stockholm (SE)

(72) Inventors: Venkata Ramesh Balabhadruni, Kista (SE); Fredrik Lindholm, Tokyo (JP)

(73) Assignee: TELEFONAKTIEBOLAGET LM ERISCCON (PUBL), Stockholm (SE)

(*) Notice: Subject to any disclaimer, the term of this patent is extended or adjusted under 35 U.S.C. 154(b) by 0 days.

(21) Appl. No.: 15/034,482

(22) PCT Filed: Nov. 8, 2013

(86) PCT No.: PCT/CN2013/086789
§ 371 (c)(1),
(2) Date: May 4, 2016

(87) PCT Pub. No.: WO2015/066897
PCT Pub. Date: May 14, 2015

(65) Prior Publication Data
US 2016/0269535 A1     Sep. 15, 2016

(51) Int. Cl.
| H04M 11/04 | (2006.01) |
| H04M 1/725 | (2006.01) |
| H04W 4/22 | (2009.01) |
| H04W 4/02 | (2009.01) |
| H04M 3/56 | (2006.01) |
| H04L 29/06 | (2006.01) |

(52) U.S. Cl.
CPC ......... *H04M 1/72541* (2013.01); *H04M 3/56* (2013.01); *H04W 4/02* (2013.01); *H04W 4/22* (2013.01); *H04L 65/1006* (2013.01); *H04L 65/1016* (2013.01); *H04M 2242/04* (2013.01); *H04M 2242/30* (2013.01)

(58) Field of Classification Search
CPC ...... H04M 1/72541; H04M 3/56; H04W 4/02
USPC ................ 455/404.1, 404.2, 518, 414.1, 418
See application file for complete search history.

(56) References Cited

U.S. PATENT DOCUMENTS

| 7,907,551 B2 | 3/2011 | Croy et al. | |
| 2005/0260976 A1* | 11/2005 | Khartabil | H04M 3/56 455/416 |
| 2006/0126631 A1* | 6/2006 | Wajda | H04M 3/42 370/392 |

(Continued)

FOREIGN PATENT DOCUMENTS

| CN | 103167457 A | 6/2013 |
| WO | WO 2010/141882 A1 | 12/2010 |

OTHER PUBLICATIONS

International Search Report and Written Opinion of the International Searching Authority, Application No. PCT/CN2013/086789, dated Jun. 30, 2014.

(Continued)

*Primary Examiner* — Nghi H Ly
(74) *Attorney, Agent, or Firm* — Sage Patent Group

(57) ABSTRACT

A method is provided for use in a communication system that includes a first terminal and an emergency center. The method includes transmitting, by a second terminal, an indicator indicating that emergency service is required for the first terminal, and automatically establishing a call session between the first terminal and the emergency center in response to the indicator.

19 Claims, 6 Drawing Sheets

(56) References Cited

U.S. PATENT DOCUMENTS

| | | | | |
|---|---|---|---|---|
| 2008/0103992 | A1* | 5/2008 | Cai | H04L 12/14 |
| | | | | 705/402 |
| 2009/0298458 | A1* | 12/2009 | Bakker | H04M 3/42348 |
| | | | | 455/404.1 |
| 2011/0117875 | A1* | 5/2011 | Oh | H04M 11/04 |
| | | | | 455/404.1 |
| 2015/0038108 | A1* | 2/2015 | Wang | H04M 3/42306 |
| | | | | 455/404.2 |

OTHER PUBLICATIONS

3GPP, Technical Specification—"3rd Generation Partnership Project; Technical Specification Group Services and System Aspects; IP Multimedia Subsystem (IMS) emergency sessions (Release 11)", 3GPP TS 23.167 V11.7.0 (Jun. 2013), 43 pp.

3GPP, Technical Specification—"3rd Generation Partnership Project; Technical Specification Group Core Network and Terminals; Conferencing using the IP Multimedia (IM) Core Network (CN) subsystem; Stage 3 (Release 11)", 3GPP TS 24.147 V11.1.0 (Mar. 2012), 208 pp.

3GPP, Technical Specification—"3rd Generation Partnership Project; Technical Specification Group Core Network and Terminals; IP multimedia call control protocol based on Session Initiation Protocol (SIP) and Session Description Protocol (SDP); Stage 3 (Release 11)", 3GPP TS 24.229 V11.9.0 (Sep. 2013), 780 pp.

European Search Report for Corresponding EP Application No. 13897051.2; dated Jun. 1, 2017; pp. 8.

\* cited by examiner

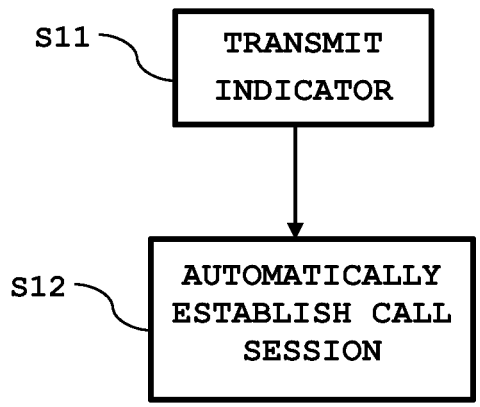
Fig. 3
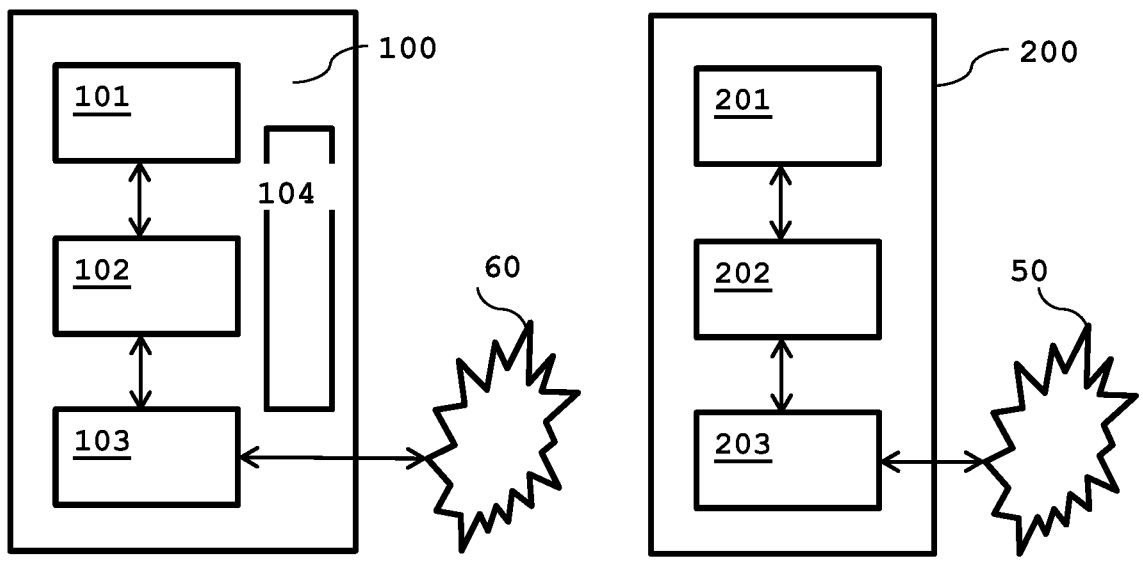
Fig. 4A                               Fig. 4B

METHOD AND APPARATUS FOR ASSISTED EMERGENCY CALLS

CROSS REFERENCE TO RELATED APPLICATION

This application is a 35 U.S.C. §371 national stage application of PCT International Application No. PCT/CN2013/086789, filed on Nov. 8, 2013, the disclosure and content of which is incorporated by reference herein in its entirety. The above-referenced PCT International Application was published in the English language as International Publication No. WO 2015/066897 A1 on May 14, 2015.

TECHNICAL FIELD

The present invention relates to methods and network entities in a communication system. More specifically, the present invention relates to establishing assisted emergency calls.

BACKGROUND

Communication systems provide services to a plurality of terminals to enable the terminals to communicate with each other. Especially, a communication link can be established between different terminals in order to exchange information in form of audio signals, text messages, images, videos, data or a mixture thereof. One example of the communication link is a call session. When a call session is established between terminals, users associated with these terminals can e.g. talk to each other or exchange information in other ways.

A special form of call session is an emergency session. Emergency sessions are special call sessions that are established between an emergency center and a terminal whose user requests emergency service. The emergency center is for example located at the local police station or the local fire department. The requested emergency service may comprise medical assistance in form of an ambulance or assistance with fire/accident by firefighters. An example of an emergency center is a so-called Public Safety Answering Point (PSAP) as known from 3GPP.

Emergency sessions have special properties compared to normal call sessions between terminals. The main reason behind this is that emergency sessions are handled in a special way and processed only by the visited network in which a terminal is active (and not by the home network associated with the user of the terminal as this is the case for normal call sessions). In many communication systems, emergency sessions are prioritized over other services and have a special emergency registration. Furthermore, emergency sessions are established using a simplified procedure e.g. by refraining from authenticating the calling terminal. Thereby, terminals can establish an emergency session even without a subscription. An example of emergency sessions in a prior art mobile communication system is described in the technical specification 3GPP TS 23.167.

SUMMARY

It is an object of the present invention to provide improvements in the handling of emergency sessions. In particular, it is an object of the present invention to provide a respective methods, terminals, network entities, computer programs, and respective computer program products for improving handling of emergency sessions.

The above object is accomplished by the subject-matter of the independent claims. Advantageous embodiments are described in the dependent claims.

According to an embodiment of the present invention, there is provided a method in a communication system comprising a first terminal and an emergency center. The method comprises the steps of transmitting, by a second terminal that is different from the first terminal, an indicator indicating that emergency service is required for the first terminal, and automatically establishing a call session between the first terminal and the emergency center in response to the indicator.

Therefore, an emergency session can be easily established between the first terminal and the emergency center without delay. Especially, the emergency session is established automatically such that no intervention of the user of the first terminal is required. Only a single call session is required to provide the user of the first terminal with emergency service. Hence, resources can be saved. As a consequence, if the user of the second terminal believes that the user of the first terminal is in need of emergency service, the user of the second terminal can enact an assisted emergency session for the first terminal. As no active participation of the user of the first terminal is required, this assisted emergency capability of the communication system can be used if the user of the first terminal is e.g. not readily able to initiate an emergency session on his own. Emergency centers typically have procedures for locating terminals even if the user of a terminal in an emergency session is limited in his communication capabilities, so that nonetheless emergency service can be provided.

According to a preferred embodiment, the call session to the emergency center is a conference session between the first terminal, the second terminal and the emergency center. In this way, the user of the second terminal can participate in the communication with the emergency center, which is very beneficial if the user of the first terminal is limited in his communication capabilities, e.g. unconscious.

According to another embodiment of the present invention, there is provided a method performed by a terminal in a communication system. The terminal comprises a user interface and a network interface. The method comprises the steps of receiving via the user interface a user request for establishing on behalf of another terminal a call session to an emergency center for another terminal, and, in response to receiving the user request, transmitting via the network interface an indicator indicating that emergency service is required for the other terminal.

According to another embodiment of the present invention, there is provided a method performed by a network entity in a communication system comprising an emergency center. The method comprises the steps of receiving over the communication system from a second terminal an indicator indicating that emergency service is required for a first terminal, and, in response to receiving the indicator, automatically establishing a call session between the first terminal and the emergency center. As a consequence, the network entity can automatically establish an emergency session for the first terminal without intervention of the user of the first terminal. Hence, the method enables the network entity to perform the assisted emergency session set up when the indicator is received from the second terminal. The network entity can be a network server within the communication system or it can be the first terminal itself.

According to another embodiment of the present invention, there is provided a terminal for a communication system comprising an emergency center. The terminal comprises a user interface configured for receiving input from a user and providing output to a user, a network interface configured to communicate with the communication system, and a processing means, such as a processor and a memory comprising instructions executable by the processor. Thereby, the terminal is operative to receive via the user interface a user request for establishing on behalf of another terminal a call session, and, in response to receiving the user request, to transmit via the network interface an indicator indicating that emergency service is required for the other terminal.

According to another embodiment of the present invention, there is provided a network entity for a communication system comprising an emergency center. The network entity comprises a communication unit configured to communicate with the communication system, and a processing means, such as a processor and a memory comprising instructions executable by the processor. Thereby, the network entity is operative to receive over the communication system from a second terminal an indicator indicating that emergency service for a first terminal is required, and automatically establish a call session between the first terminal and the emergency center in response to receiving the indicator.

According to another embodiment of the present invention, the network entity may be a network server, for example embodied in a server computer, or the first terminal.

According to another embodiment of the present invention, there is provided a computer program loadable onto a processing unit of a network entity, which network entity may be the network server, the first terminal or the second terminal. The computer program comprises code for executing method embodiments of the present invention.

According to another embodiment of the present invention, there are provided corresponding computer program products comprising such computer programs.

BRIEF DESCRIPTION OF THE DRAWINGS

Embodiments of the present invention, which are presented for better understanding of the inventive concept but which are not to be seen as limiting the invention, will now be described with reference to the Figures, in which:

FIG. 3 shows a flowchart of a method embodiment of the present invention;

FIG. 4A shows a schematic representation of a terminal according to an embodiment of the present invention;

FIG. 4B shows a schematic representation of a network entity according to an embodiment of the present invention;

DETAILED DESCRIPTION

In accordance with embodiments of the invention, it is possible to address various problems that are envisionable in known systems.

Assume for example that two terminals referred to as terminal A and terminal B for the sake of simplicity are engaged in an ongoing call session and are in two different locations.

During the conversation, one of the users (user-A associated with terminal A) suddenly realizes that the other user (user-B associated with terminal B) requires emergency service (for example due to heart attack, accident, fire, etc.). The user of terminal B may be in a situation that he/she will not be able to make an emergency call. In this situation, it becomes quite urgent for user-A to contact the emergency center serving terminal B in order to request emergency service. To do so, in known systems user-A has to terminate the call session with user-B and establish a new emergency session with an emergency center. More specifically, a normal call session and an emergency call session is not possible at the same time, as the emergency call requires special treatment with special emergency registration. Furthermore, it is not easy for the emergency center to readily identify and locate user-B. Therefore, precious time may be lost.

The situation may be even more severe if terminal A and terminal B are served by two different networks, e.g. are in different visited networks. An emergency call made by user-A is processed by the visited network attached to terminal A. The user-A will not be able to reach the emergency center associated with the network serving terminal B. In other words, an emergency session is a visited network service and only routed within the local visited network. This is due to the fact that it is only the visited network that can route correctly to the closest emergency center. Furthermore, the emergency center of the network serving terminal B does not have immediate access to location information in the network serving terminal A. Thus, the emergency service requested by user-A may be delayed. Moreover, the load in the communication system is increased as information has to be exchanged between the two networks.

The basic concept of assisted emergency sessions as described in the independent claims greatly improves the possibilities of providing emergency service, as will become more apparent from the following description of various embodiments of the invention.

Figure 1:
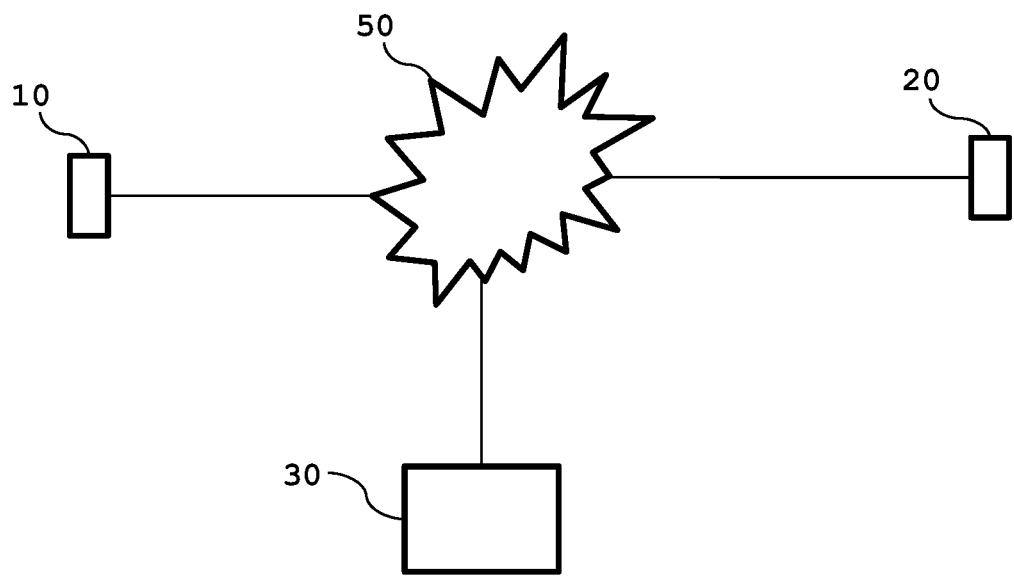
FIG. 1 shows a schematic representation of a communication system according to an embodiment of the present invention.

FIG. 1 shows a schematic representation of a communication system according to an embodiment of the present invention. Examples of such communication systems are cellular networks. The shown communication system comprises a first terminal 20, a second terminal 10, an emergency center 30 and a communication network 50. The communication network 50 may be of any suitable or desirable kind for providing communication services to terminals and servers that are in communication connection with the network. For example, network 50 can be a data and voice communication network operating according to any known applicable standard, such as a public switched telephone network (PSTN), or a mobile communication network, such as a GSM network, a UMTS network or an LTE network. Network 50 can also be a combination of different kinds of networks that are arranged for cooperation by appropriate interface elements, e.g. a plurality of mobile communication networks. Elements that communicate with or within a communication are referred to as network entities, such that any of these elements 10, 20, 30 may be referred to as a network entity.

FIG. 1 shows terminal 10 and terminal 20. In general, a terminal is characterized by constituting an endpoint of a communication link and being suitable for user interaction. Hence, as is well known, a terminal will in general comprise a user interface for receiving input (e.g. data, commands, etc) from a user of the terminal and to give output to a user (e.g. messages, input prompts, etc.). For example, the user interface may comprise a keyboard for receiving user input and a display for providing output to a user. Furthermore, the terminal will comprise a network interface arranged for communicating with the communication network. For example, the network interface can comprise well known hardware elements for physical communication (e.g. antennas, wireless receivers and transmitters, signal processing units, I/O units, etc.) and software (control software for controlling the hardware). Without limitation, examples of a terminal are a phone, a mobile phone, a fixed line phone, a notebook computer, a personal computer (PC), a smartphone, a personal digital assistant (PDA), a tablet computer, or any other user equipment (UE).

Terminal 10 and terminal 20 are shown as connected to a network 50, respectively. The term "connected" means that information can be exchanged between terminals 10, 20 and network 50 using wired or wireless communication links. The description of only two terminals is purely for the sake of describing the inventive concept and in no way limiting, as it is well known that communication networks in general will be able to provide communication services to more than two terminals at the same time. The network 50 may be provided any suitable and know way, and may e.g. comprise server computers like switches, proxies, routers or hubs in order to provide communication services to terminals 10, 20.

An emergency center 30 is shown as connected to the network 50. For simplicity, only a single emergency center is shown. Hence, the invention also extends to the case in which more than one emergency center is provided and connected to the network 50. The emergency center is for example located at the local police station, the local fire department or any other location at which the provision of emergency services is managed.

According to the example shown in FIG. 1 it is assumed that there is an ongoing call session between terminal 10 and terminal 20. During the call session, the user of terminal 10 realizes that the user of terminal 20 needs emergency service. The reason for this may be a medical emergency, a fire, an accident or the like. However, the user of terminal 20 may not be able to call for help himself. Therefore, terminal 10 transmits an indicator indicating that emergency service is required for terminal 20. This can be initiated by the user in any suitable or desirable way, e.g. the user of terminal 10 may request transmission of the indicator by typing a particular code or selecting a menu item at terminal 10.

The indicator may be transmitted in the ongoing call session. In this respect, the indicator may be a particular parameter or message defined by the communication protocol governing the ongoing call session. Alternatively, the indicator can be transmitted in a new connection between terminal 10 and the network 50, i.e. outside of the initial call session. For example, a the indicator can be sent to the network in a dedicated network message that identifies the purpose of setting up an assisted emergency session for terminal 20, where the message also identifies terminal 20 appropriately. A server in the network 50 can then detect the message and set up the assisted emergency session in response. As a further alternative, the indicator can be sent as part of a new call set-up request towards terminal 20, where the network 50 or the destination terminal 20 can then process the indicator for automatically establishing the call session to the emergency center.

According to another example, there is no ongoing call session between terminal 10 and terminal 20, and the user of terminal 10 for other reasons than discussed above decides to initiate an assisted emergency session for the user of terminal 20. For example, the user of terminal 10 may have not been able to reach the user of terminal 20, and concludes that this is due to an emergency. The indicator can then be sent like in the preceding example, e.g. in a dedicated network message or as part of a new call set-up request towards terminal 20.

In response to the indicator, a call session between the first terminal 20 and the emergency center 30 is established automatically. In other words, an assisted emergency session is set up. Therefore, no manual intervention or consent of the user of terminal 20 is required and the user of terminal 20 is provided with an assisted emergency session. In other words, the call session between the first terminal 20 and the emergency center 30 is established forcibly without requiring any action or consent from the user of terminal 20.

In one example of the invention, the call session may be established by terminal 20 in response to receiving the indicator. In this case, terminal 20 is operable to receive from terminal 10 over the network 50 the indicator indicating that emergency service for terminal 20 is required, and automatically establish a call session between the terminal 20 and the emergency center 30 in response to receiving the indicator.

Alternatively, in another example of the invention the call session may be established by a network server computer in the network 50 which intercepts the indicator. This can be done in any suitable or desirable way. For example, the network 50 may comprise routing servers for communicating packets between terminals, and each routing server may have a functionality to identify the indicator as a predefined data element. In one implementation the routing servers may have the functionality to then set up the call session between terminal 20 and emergency center 30. In another implementation the routing servers may be configured to notify one of one or more dedicated assisted set-up servers that in turn then establish the call session between the terminal 20 and the emergency center 30.

Once the call session is established, the emergency center can easily and efficiently provide emergency service to the user of terminal 20 according to known procedures and protocols.

According to a preferred embodiment of the invention, the call session as initiated in accordance with one or more of the above described examples is a conference session between terminal 10, terminal 20 and emergency center 30. Thus, terminal 10 also takes part in the emergency call session. Thereby, the user of terminal 10 can provide further information to the emergency center, such as location information or particulars of the emergency (e.g. the type of emergency). The conference call session can be a voice conference session, a data conference session or both a voice and data conference session.

If the starting point of the procedure is a call session between terminals 10 and 20, where terminal 10 initiates the assisted emergency session set-up by sending the indicator, it is possible to keep an ongoing call if the user of terminal 10 wishes to make an emergency call, and furthermore, it is possible to add an emergency call to an existing call session as an ad-hoc conference. An ad-hoc conference is an unscheduled conference that is created on-the-fly by a conference participant.

Alternatively, the setting up of the emergency conference session may also involve terminating an ongoing regular call session between terminals 10 and 20 and subsequently automatically (i.e. without intervention or consent of the user of terminal 20) establishing a conference call between terminals 10, 20 and emergency center 30.

Figure 2:
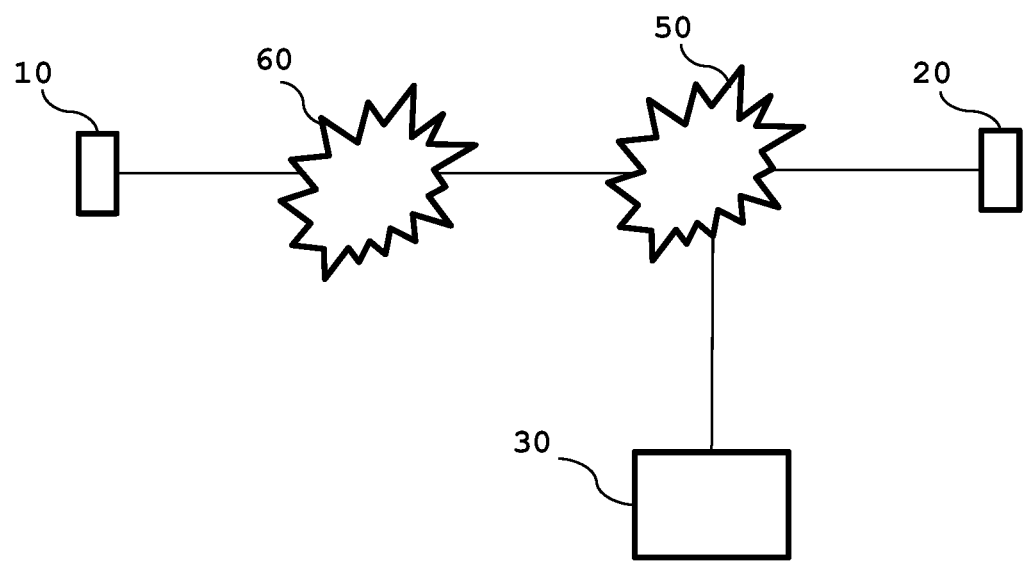
FIG. 2 shows a schematic representation of another communication system according to an embodiment of the present invention.

FIG. 2 shows a schematic representation of another communication system according to an embodiment of the present invention. Further to the communication system shown in FIG. 1, terminal 10 is connected to a network 60. Network 60 is separate from but connected to network 50. For example, networks 50 and 60 can be separate mobile communication networks connected by appropriate gateways. Moreover, network 60 is connected to at least one emergency center (not shown) of its own. If terminal 10 initiates an emergency call, the network 60 establishes a call session between the terminal 10 and the emergency center connected to network 60, since emergency calls should be routed to the nearest emergency center. In other words, if the home network of terminal 10 is network 50, then the emergency call session requested over visited network 60 will be set-up with the emergency center of the visited network. According to prior art communication systems, the terminal 10 thus could not establish a call session with emergency center 30 of network 50. The present invention provides methods and systems which enable terminal 10 to provide terminal 20 with an assisted call session to emergency center 30.

For example, if terminal 20 is arranged as described above to receive and process the indicator, then the terminal 20 can automatically establish the call session with the emergency center 30 of the communication network 50 that is providing communication services to terminal 20. Terminal 20 can be arranged to do this during an ongoing call session with terminal 10 if terminal 10 sends the indicator during the ongoing call session. Alternatively or additionally, terminal 20 may also be arranged to react to the indicator in a call set-up procedure for a new call session initiated by terminal 10.

According to another example of FIG. 2, a network server involved in providing communication service for terminal 20, e.g. a call control server, an access network server, etc., can be arranged to intercept the indicator and in turn initiate establishment of a call session between terminal 20 and emergency center 30.

FIG. 3 shows a flowchart of a basic method embodiment of the present invention. In step S11, terminal 10 transmits an indicator indicating that emergency service is required for terminal 20. In step S12, a call session between the first terminal 20 and the emergency center is automatically established in response to the indicator. Step S12 can be performed by terminal 20 or by a network server in network 50.

FIG. 4A schematically shows an example of a terminal according the invention. As shown in FIG. 4A, for performing the processing and method described herein, the terminal 100 may comprise a processor 102, a memory 101 coupled to the processor 102, and a communication unit 103 coupled to the processor 102. The communication unit 103 is configured to communicate with the network 60. The communication unit 103 thus constitutes a network interface to network 60. The terminal also comprises a user interface 104 for receiving input from a user and giving output to the user, e.g. a keyboard and display. Further, in the memory 101 there may be stored a computer program loadable into the processor 102 comprising code for executing the steps of any of the described method embodiments of the present invention.

According to one example, the terminal 100 is operative to receive via the user interface 104 a user request for establishing on behalf of another terminal (terminal 20 in the examples of FIGS. 1 and 2) a call session to emergency center 30, and in response to receiving the user request, to transmit via the network interface 103 to network 60 an indicator indicating that emergency service is required for the other terminal.

According to another example, terminal 20 of FIGS. 1 and 2 as described above can also be arranged as shown in FIG. 4A, where terminal 100 can be operative to receive over the communication network 60 and network interface 103 from a different terminal an indicator indicating that emergency service for terminal 100 is required, and automatically establishing a call session between terminal 100 and the emergency center in response to receiving the indicator.

FIG. 4B schematically shows an example of a network entity according the invention. As shown in FIG. 4B, for performing the processing and method described herein, the network entity 200, which may be a network server, may comprise a processor 202, a memory 201 coupled to the processor 202, and a communication unit 203 coupled to the processor 202. The communication unit 203 is configured to communicate with the network 50 as a network interface. Further, in the memory 201 there may be stored a computer program loadable into the processor 202 comprising code for executing the steps of the described method embodiments of the present invention. This method may be adapted to another disclosed embodiment.

The network entity 200 is arranged to be operative to receive over the communication network 50 via the network interface 203 from a second terminal (e.g. terminal 10 of FIGS. 1 and 2) an indicator indicating that emergency service for a first terminal (e.g. terminal 20 of FIGS. 1 and 2) is required, and automatically establishing a call session between the first terminal and the emergency center in response to receiving the indicator.

Figure 5:
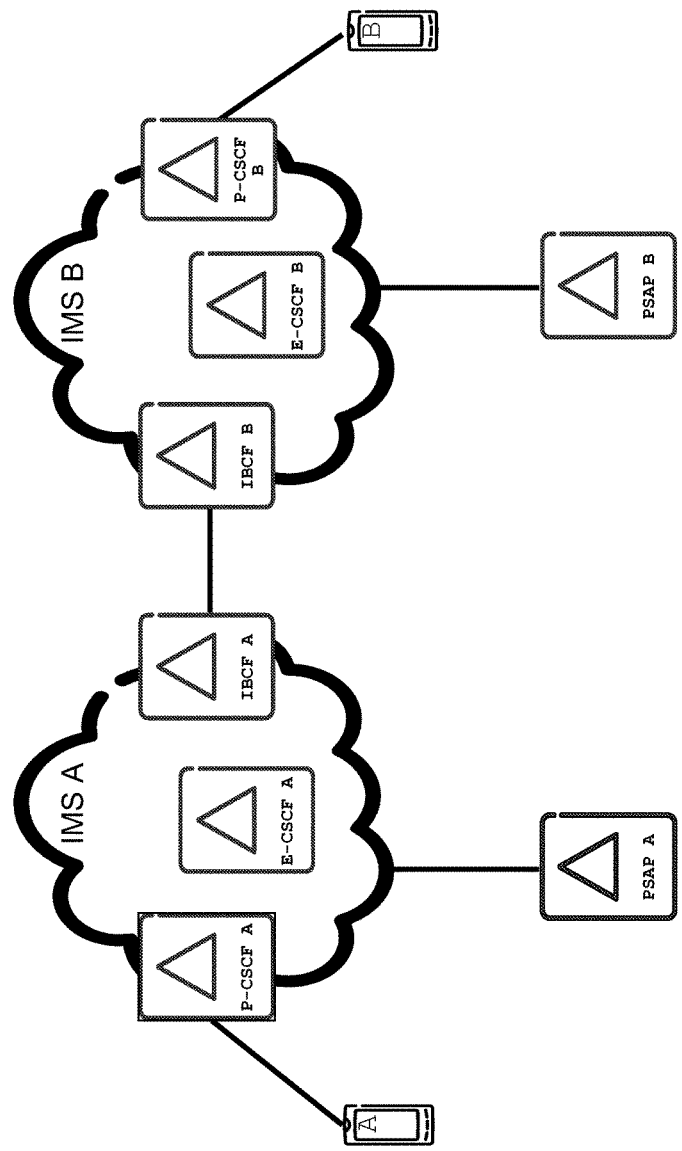
FIG. 5 shows a schematic representation of another communication system according to an embodiment of the present invention.

FIG. 5 shows a schematic representation of another communication system according to a more detailed embodiment of the present invention. In this embodiment, the communication system comprises IP multimedia core network subsystems (IMS). Access to an IMS can be achieved in a variety of ways, e.g. via a mobile communication system, a fixed communication system. According to an embodiment, the concept of the invention can thus be applied to mobile communication systems operating according to the 3GPP standard. Here, "mobile communication network" may denote a communication network in which communication is performed in a wireless way. FIG. 5 shows a high level network diagram.

The communication system comprises a terminal A as an example of previously described terminal 10, a terminal B as an example of previously described terminal 20, an IP multimedia core network subsystem (IMS) A as an example of previously described network 60, an IMS B as an example of previously described network 50, a public safety answering point (PSAP A) connected to IMS A, and a PSAP B as an example of previously described emergency center 30, connected to IMS B. IMS A comprises a proxy call session control function (P-CSCF) A, an emergency call session control function (E-CSCF) A and an interconnection border control function (IBCCF) A. P-CSCF A, E-CSCF A and IBCF A are examples of network entities in IMS A. Similarly, IMS B comprises a P-CSCF B, an E-CSCF B and an IBCF B, which are examples of network entities in IMS B. A PSAP is a network entity that is typically provided at a physical location where emergency calls from the public are received, e.g. at an emergency service dispatcher.

There can be one or more transit networks between IMS A and IMS B which are not shown for simplicity. IMS A and IMS B can be in close proximity, e.g. the same city or, but can equally be far separated, like in two different cities or even countries.

According to an embodiment, if it is desired to arrange the invention such that the assisted emergency call indicator should be sendable during an ongoing call session, it is preferable that during registration of terminal A, terminal A and IMS A exchange a specific media feature tag or feature-capability indicator to indicate whether they support a functionality according to the present invention, like the assisted emergency session set-up in general or an inband emergency conference call function in particular, or not. A similar exchange may happen between terminal B and IMS B. However, it is also possible to arrange the terminals A, B and IMSs A, B to have specific generally known default capabilities, so that no explicit exchange of information on capabilities takes place.

Figure 6:
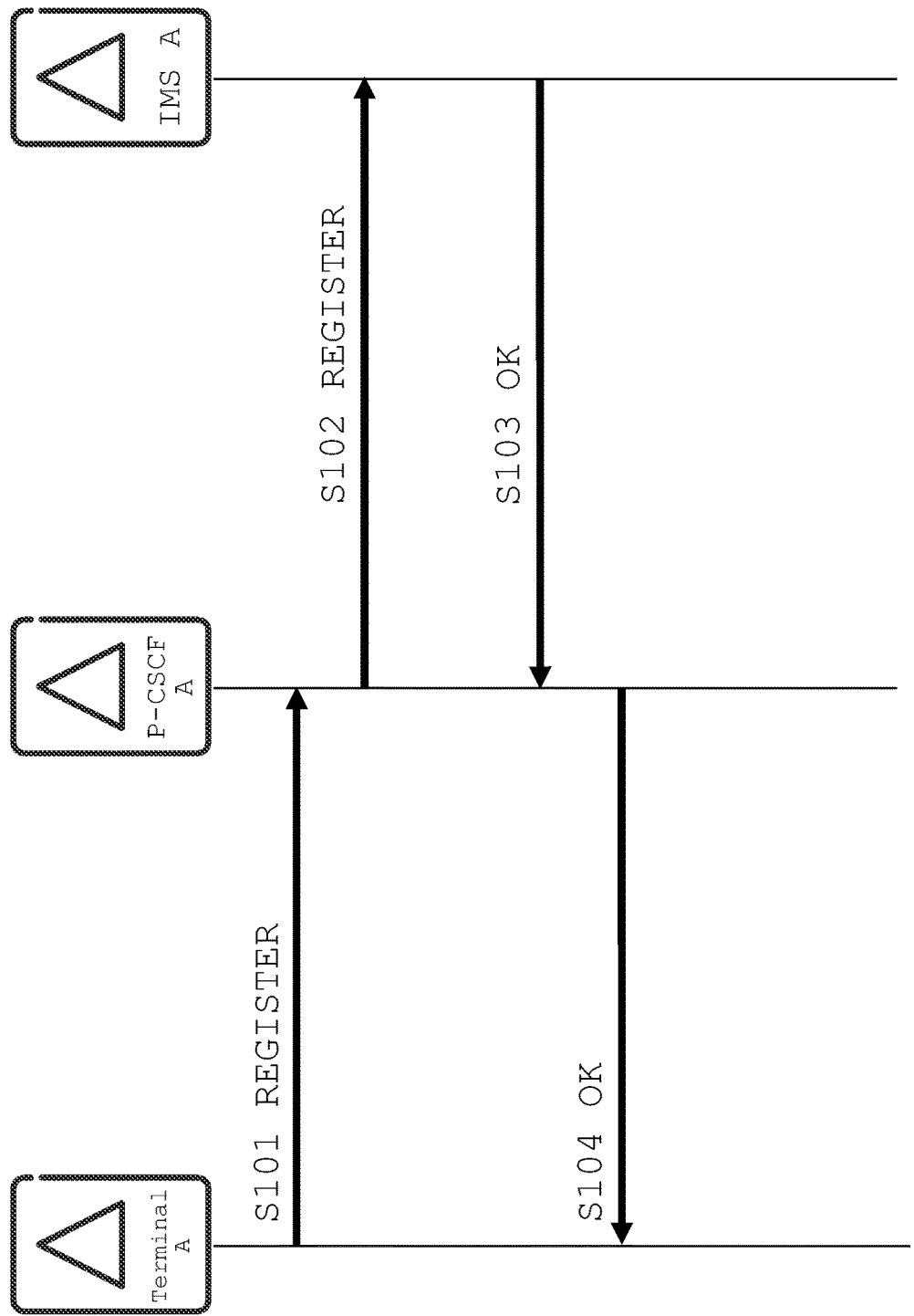
FIG. 6 shows a simplified registration procedure according to an embodiment of the present invention.

FIG. 6 shows a simplified registration procedure where the user authorization part and IMS core network nodes (for example, I-CSCF, S-CSCF) are omitted for simplicity. In step S101, terminal A sends a REGISTER message to P-CSCF A. The REGISTER message may comprise a media feature tag or a feature-capability indicator. In response thereto, the P-CSCF A sends a REGISTER message to the register control node of IMS A in step S102. In step S103, the register control node of IMS A sends an OK message to P-CSCF A. In step S104, the P-CSCF A sends an OK message comprising a media feature tag or a feature-capability indicator to terminal A.

Figure 7:
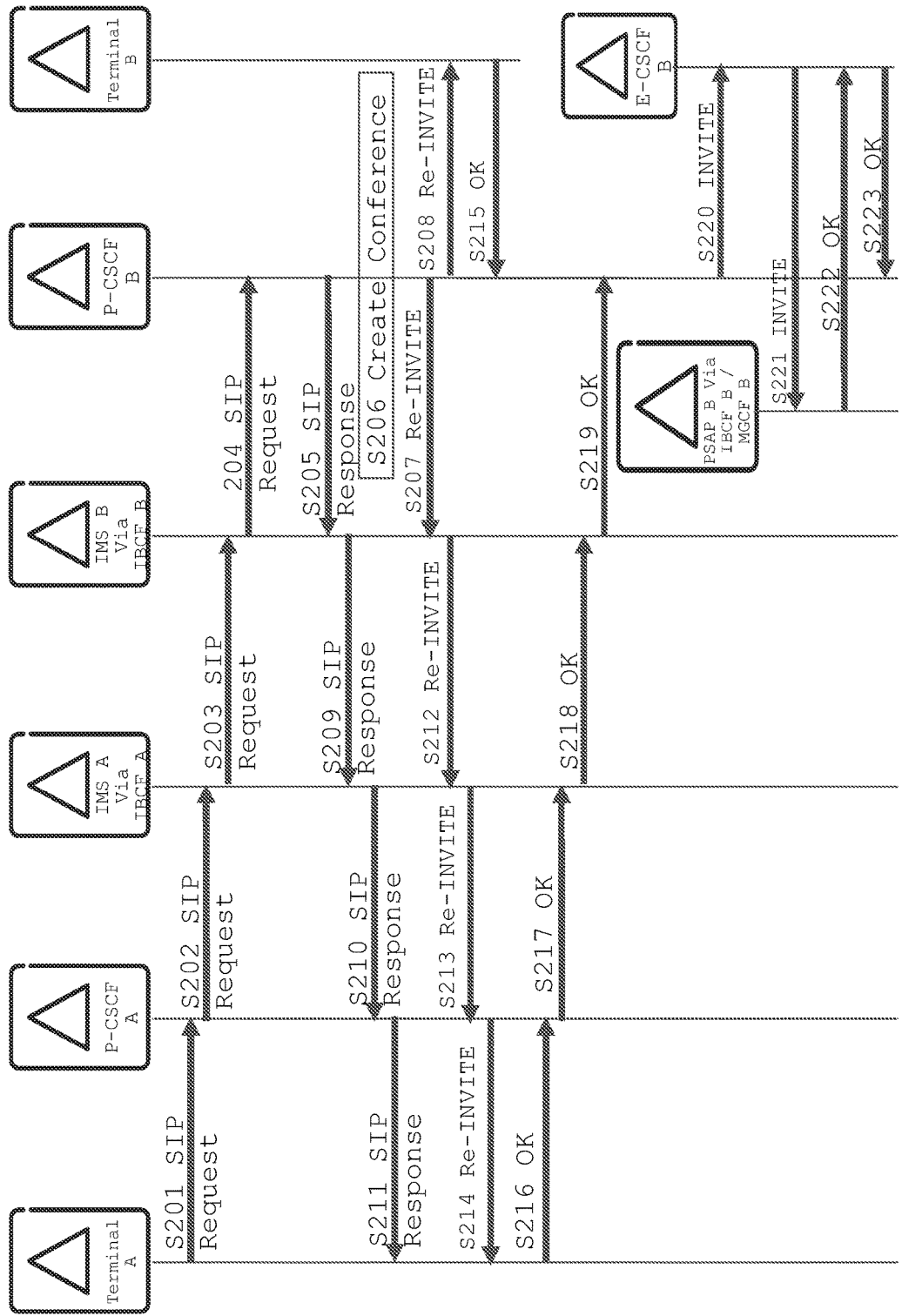
FIG. 7 shows a procedure for establishing an emergency session according to an embodiment of the present invention.

FIG. 7 shows a procedure for establishing an emergency session according to an embodiment of the present invention. The procedure can be performed in a communication system as shown in FIG. 5. In this embodiment, under the initiative of terminal A, a conference session is established between terminal A, terminal B and PSAP B. The procedure may use the session initiation protocol (SIP) as for example defined in RFC3261.

In the shown example it is assumed that terminal A and terminal B have an ongoing call session. When the user of terminal A requests emergency service for terminal B, terminal A sends an inband indicator within the existing call (step S201). The indicator may be sent in a SIP message, e.g. as a dedicated SIP message or a dedicated parameter in a SIP message. Terminal A may optionally provide additional information, e.g. indicate the type of emergency (for example sos.ambulance, sos.fire, etc.). The indicator is transmitted via P-CSCF A, IBCF A, IBCF B to P-CSCF B (steps S202, S203, S204). P-CSCF B acknowledges receipt of the indicator by sending a SIP response to terminal A (steps S205, S209, S210 and S211).

When the P-CSCF B receives the indicator (in this example an inband indicator), it creates a conference uniform resource identifier (URI) (step S206) and modifies the existing SIP dialog (steps S207 and S208) to add terminal A and terminal B in to the created conference. More specifically, the P-CSCF B sends a Re-INVITE message to terminal B (step S208) and terminal A (steps S207, S212, S213 and S214). Alternatively, an UPDATE message could be sent in place of the Re-INVITE message. Terminal B responds with an OK message (step S215). Further, terminal A responds with an OK message (steps S216, S217, S218 and S219).

The P-CSCF B will also add the emergency center (PSAP B) in to the conference, thus allowing terminal A and terminal B to communicate with the emergency center. The routing towards the PSAP/emergency center can be done according to existing routing procedures, via E-CSCF B (with terminal B as the calling party). This can be done by sending an INVITE toward the PSAP B via the E-CSCF B (steps S220 and S221). To secure that the PSAP B will be able to know who the call relates to, the P-CSCF B may add the identity of terminal B as calling party identity, with additional location information. If location information is not available, the E-CSCF B may interact with the Location Retrieval Function to fetch location (or reference to it) according to standard procedures.

Although shown and described in a sequence, this is only exemplary and some of these call flows can equally happen in parallel (for example step S220 can be immediately after S208).

In summary, the embodiment described with reference to FIG. 7 may operate as follows. The user of terminal A detects that the emergency service is required for user of terminal B and triggers an inband indicator in the ongoing call. Upon receiving the inband indicator in the ongoing call, the serving P-CSCF in the remote network (i.e. P-CSCF B) triggers an emergency conference call. The P-CSCF B may decide not to forward the inband indicator to terminal B. The P-CSCF B modifies the ongoing call (between terminal A and terminal B) and adds terminal A and terminal B as two participants in the emergency conference call. The P-CSCF B also invites the emergency center serving the terminal-B's network (i.e. PSAP B) as a third participant. The P-CSCF B may add the location of terminal B in the invitation sent to the emergency center (i.e. PSAP B).

The terminal-B location and identity which are desirable for the emergency call can be obtained from the P-CSCF B using existing procedures. The location and identity of terminal-A is not important from PSAP B perspective. Technically this information can be obtained from P-CSCF A or IMS A, if there is a need for it.

Figure 8:
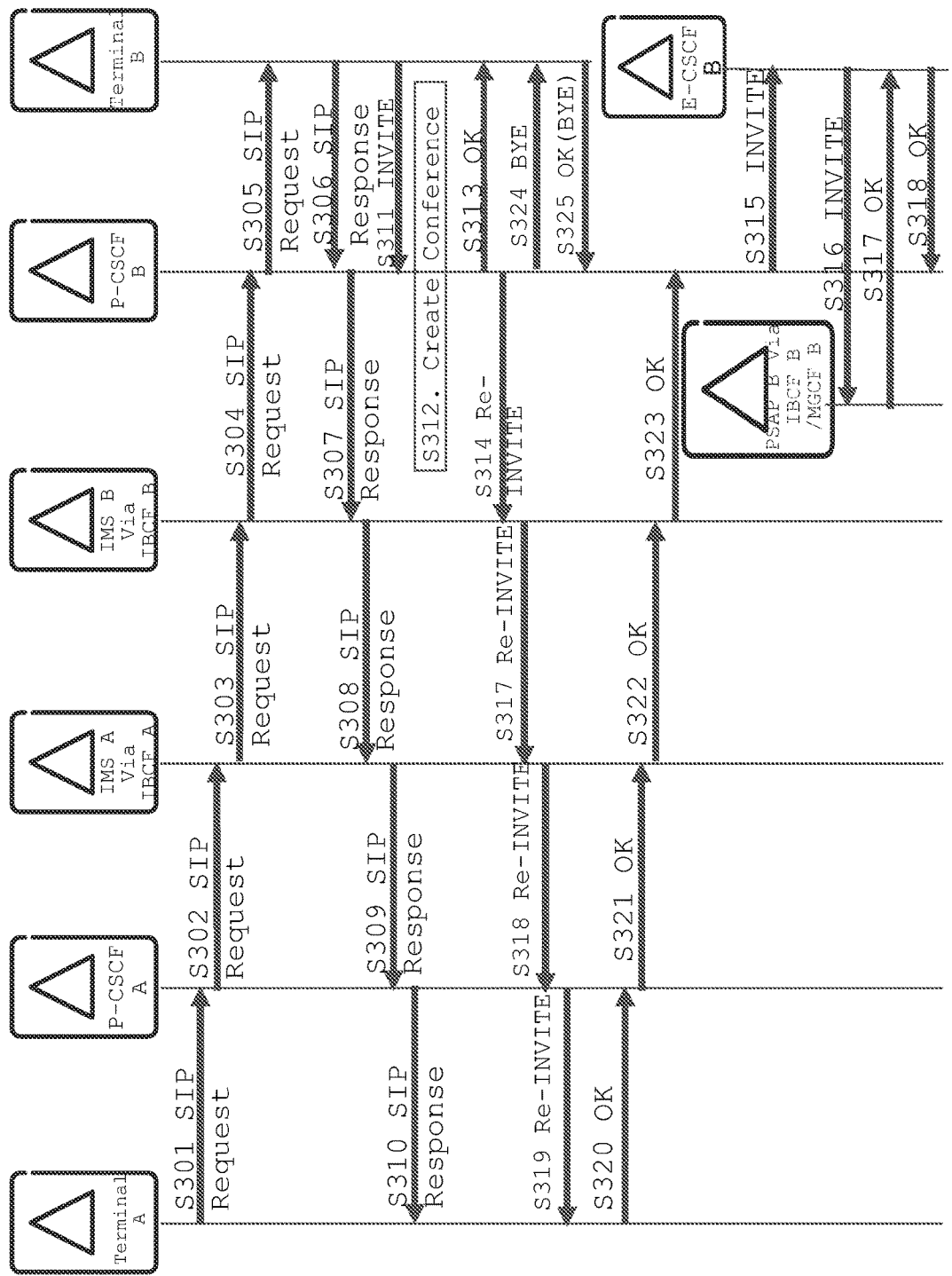
FIG. 8 shows another procedure for establishing an emergency session according to an embodiment of the present invention.

FIG. 8 shows another procedure for establishing an emergency session according to an embodiment of the present invention. In this embodiment, a conference session is established between terminal A, terminal B and PSAP B. The procedure can be performed in a communication system as shown in FIG. 5.

It is again assumed that terminal A and terminal B have an ongoing call session. When the user of terminal A requests emergency service for terminal B, terminal A sends an inband indicator within the existing call (step S301). The terminal-A may optionally provide further information, e.g. indicate the type of emergency (for example sos.ambulance, sos.fire, etc.). The indicator is transmitted via P-CSCF A, IBCF A, IBCF B to P-CSCF B and terminal B (steps S302, S303, S304, S305). Terminal B acknowledges receipt of the indicator by sending a SIP response to terminal A (steps S306, S307, S308, S309 and S310).

When the terminal B receives the inband indicator, it automatically triggers an initial INVITE to P-CSCF B for ad-hoc conference creation (step S311). The INVITE may include a URI list as specified in 3GPP TS 24.147 section 5.3.1.5.4. The URI list contains the SIP URI identity of all users that are to be invited to the conference, i.e. the SIP URI identity of PSAP B and SIP dialog ID of the existing SIP dialog between terminal A and terminal B.

The P-CSCF B creates the conference URI (step S312) and answers the INVITE from terminal B (step S313). The P-CSCF B modifies the existing SIP dialog (step S314) to add the terminal-A in to the conference. More specifically, the P-CSCF B sends a Re-INVITE message to terminal A (steps S314, S317, S318 and S319). Terminal A responds with an OK message (steps S320, S321, S322 and S323). Alternatively to the Re-INVITE message, an UPDATE message could be used.

Furthermore, the original SIP dialog towards terminal B is released with a BYE message (step S324). Terminal B confirms by sending an OK message to P-CSCF B (step S325).

The P-CSCF B will also add the emergency center (PSAP B) in to the conference (steps 3S15 and S316) and thus allow the terminal A and terminal B to communicate with the emergency center. The routing towards the emergency center can be done according to existing routing procedures, via E-CSCF B (with terminal B as the calling party). This is e.g. done by sending an INVITE toward the PSAP B via the E-CSCF B (step S315). To secure that the PSAP B will be able to know who the call relates to, the P-CSCF B may add the identity of terminal B as calling party identity, with additional location information. If location information is not available, the E-CSCF B may interact with the Location Retrieval Function to fetch location (or reference to it) according to standard procedures.

In summary, the embodiment described with reference to FIG. 8 may operate as follows. The user of terminal A detects that the emergency service is required for the user of terminal B and triggers an inband indicator in the ongoing call. The P-CSCF B forwards the inband indicator to terminal B. Upon receiving the inband indicator in the ongoing call, the remote party (i.e. terminal B) automatically triggers an ad-hoc emergency conference call. The ad-hoc conference call is specified in 3GPP TS 24.147 section 5.3.1.5.4. No manual intervention is needed at the remote party. In other words, the set-up is automatic and does not require interaction with or consent from the user of terminal B. The terminal B involves the terminal A and emergency center serving the network of terminal B (i.e. PSAP B) in to the ad-hoc emergency conference call.

The ad-hoc emergency conference can be done over the normal IMS registration so that it can be linked with the existing ongoing call. The IMS B may handle the IMS conference request for the emergency center as a normal ad-hoc conference call. Preferably, the call is handled with a higher priority (for example, P-CSCF B by detecting the inband indicator in the ongoing call between terminal A and terminal B, and then the subsequent ad-hoc conference request from terminal-B).

The embodiments presently described with reference to FIGS. 7 and 8 disclose two variants of emergency conference call creation by P-CSCF B and terminal B in a system as shown in FIG. 5. However it is possible for P-CSCF B or terminal B to use other variants of conference calls described in 3GPP TS 24.147. Also the inband indicator can be sent in a new call instead of an existing call between terminal A and terminal B.

The ACK (acknowledge) requests are not shown in the FIGS. 7 and 8 for simplicity. Also, some of the IMS core network nodes (for example, S-CSCF) are not shown for simplicity.

Denial of Service (DoS) attacks may originate from access networks and the P-CSCF is designed to protect the network from DoS attacks. Furthermore, there are IBCFs on the edge of the IMS networks protecting it from DoS attacks originated from other networks (if any). The present invention has no special risk of DoS attacks from other networks.

As an alternative to the above solutions described in connection with FIGS. 5 to 8, the P-CSCF of the A party could be the entity to invoke the conference instead of P-CSCF of B. The flows would be similar to the above, with the difference that P-CSCF of A would handle the emergency conference.

The above embodiments of the present invention may provide one or more of the following advantages. It is possible to add a PSAP as part of an ad-hoc conference call in the visited network. This could avoid situations where one party has to hang up the call just to place an emergency call, and also secure that the person in distress does not need to be cut off.

The described embodiments comply with current regulations when both terminal A and terminal B are in the same country or different countries. For example, to avoid that the service is misused, similar procedures can be applied as for normal emergency call, i.e., discourage users to misuse it by making it illegal to initiate assisted emergency calls if not required.

Additionally, the location of the user under distress (terminal-B in this case) is notified to the emergency center (PSAP B), or can be fetched using Location based procedures. The location of the assisted user (terminal-A in this case) is not critical for the PSAP B, but can be obtained from a technical perspective.

Although detailed embodiments have been described, these only serve to provide a better understanding of the invention, which is defined by the appended claims, and are not to be seen as limiting.

What is claimed is:

1. A method in a communication system comprising a first terminal and an emergency center, the method comprising:
receiving, by a network server in the communication system, an indicator transmitted by a second terminal during a set-up of a call session between the second terminal and the first terminal, the indicator indicating that emergency service is required for the first terminal; and
automatically establishing, by the network server, a conference session between the first terminal and the emergency center in response to receiving the indicator, wherein the conference session communicatively connects the first terminal, the second terminal and the emergency center.

2. The method according to claim 1, wherein the indicator is transmitted upon a request of a user of the second terminal.

3. The method according to claim 1, wherein the indicator is received in a call session between the first terminal and the second terminal.

4. The method according to claim 1, wherein the communication system further comprises a first network connected to the first terminal and the emergency center, and a second network connected to the second terminal.

5. The method according to claim 1, further comprising sending location information of the first terminal to the emergency center.

6. A computer program product comprising a non-transitory computer readable storage medium storing instructions executable by a processor to cause the processor to perform the method according to claim 1.

7. The method according to claim 1, wherein the indicator transmitted by the second terminal comprises a Session Initiation Protocol (SIP) message transmitted over an IP Multimedia Subsystem (IMS) network to the network server.

8. The method according to claim 7, wherein establishing the conference session communicatively connecting the first terminal, the second terminal and the emergency center comprises a RE-INVITE SIP message or an UPSATE SIP message in the IMS network.

9. The method according to claim 1, wherein the indicator is transmitted as part of a new call set-up request towards the first terminal.

10. A method performed by a first terminal in an IP Multimedia Subsystem (IMS) network, the first terminal comprising a network interface, the method comprising:
   receiving, during a call session between the first terminal and a second terminal, an indicator comprising a first Session Initiation Protocol (SIP) message from the second terminal for establishing a call conference with an emergency center;
   in response to receiving the first SIP message, transmitting via the network interface a second SIP message to a network server of the IMS network indicating that emergency service is required for the first terminal; and
   establishing the call session between the first terminal and the emergency center,
   wherein the call session is established as a conference session communicatively connecting the first terminal, the second terminal and the emergency center.

11. The method according to claim 10, wherein the second SIP message comprises an INVITE SIP message transmitted to the network server on the IMS network.

12. The method according to claim 10, wherein the first SIP message is received during a set-up of a second call session between the first terminal and the second terminal.

13. A first terminal comprising a processor configured to perform operations comprising the method of claim 10.

14. A method performed by a network entity in an IP Multimedia Subsystem (IMS) network comprising an emergency center, the method comprising the steps of:
   receiving over the IMS network from a second terminal, during a set-up of a call session between the second terminal and a first terminal, an indicator comprising a Session Initiation Protocol (SIP) message indicating that emergency service is required for the first terminal; and
   in response to receiving the indicator, automatically establishing a conference session between the first terminal and the emergency center,
   wherein the conference session communicatively connects the first terminal, the second terminal and the emergency center.

15. The method according to claim 14, wherein the network entity is a network server.

16. The method according to claim 15, wherein establishing the conference session communicatively connecting the first terminal, the second terminal and the emergency center comprises a RE-INVITE SIP message or an UPDATE SIP message in the IMS network.

17. The method according to claim 14, wherein the network entity is the first terminal.

18. A network entity comprising a processor configured to perform operations comprising the method of claim 14.

19. The method according to claim 14, wherein the indicator is transmitted during a set-up of a call session between the first terminal and the second terminal.

* * * * *